(12) United States Patent
Chen et al.

(10) Patent No.: US 11,163,867 B2
(45) Date of Patent: Nov. 2, 2021

(54) METHOD AND SYSTEM FOR AUTHORIZING ACQUISITION OF ATTACK ALARM INFORMATION LOG OF TERMINAL

(71) Applicant: Fujian LANDI Commercial Equipment Co., Ltd, Fujian (CN)

(72) Inventors: Feifei Chen, Fujian (CN); Hui Lin, Fujian (CN)

(73) Assignee: Fujian LANDI Commercial Equipment Co., Ltd, Fujian (CN)

( * ) Notice: Subject to any disclaimer, the term of this patent is extended or adjusted under 35 U.S.C. 154(b) by 281 days.

(21) Appl. No.: 16/327,861

(22) PCT Filed: Aug. 10, 2017

(86) PCT No.: PCT/CN2017/096826
§ 371 (c)(1),
(2) Date: May 16, 2019

(87) PCT Pub. No.: WO2018/040880
PCT Pub. Date: Mar. 8, 2018

(65) Prior Publication Data
US 2019/0278899 A1    Sep. 12, 2019

(30) Foreign Application Priority Data
Aug. 30, 2016    (CN) .......................... 201610768537.1

(51) Int. Cl.
G06F 21/34    (2013.01)
G06F 21/44    (2013.01)
(Continued)

(52) U.S. Cl.
CPC .............. *G06F 21/34* (2013.01); *G06F 21/44* (2013.01); *G06F 21/602* (2013.01); *G06F 21/62* (2013.01);
(Continued)

(58) Field of Classification Search
None
See application file for complete search history.

(56) References Cited

U.S. PATENT DOCUMENTS

2006/0294378 A1* 12/2006 Lumsden ............... G06Q 20/20
713/171

FOREIGN PATENT DOCUMENTS

CN    102013141    4/2011
CN    102013141 A *    4/2011
(Continued)

OTHER PUBLICATIONS

"International Search Report (Form PCT/ISA/210)", dated Nov. 13, 2017, with English translation thereof, pp. 1-4.

*Primary Examiner* — Jeffrey C Pwu
*Assistant Examiner* — Mayasa A. Shaawat
(74) *Attorney, Agent, or Firm* — JCIPRNET (57) ABSTRACT

A method and a system for authorizing acquisition of an attack alarm information log of a terminal, belonging to the field of communication technology, the method includes: after obtaining the authentication account with an authority to obtain the attack alarm information log, a server authenticates the legality of a client tool; after the legality passes the authentication, the terminal sends a second to-be-authenticated data to the client tool, and the client tool sends the second to-be-authenticated data to the server; after the second to-be-authenticated data passes the authentication, the server encrypts the second to-be-authenticated data to generate a second authentication data, and sends the second authentication data to the terminal; if the second authentication data passes the authentication, the terminal obtains and encrypts the attack alarm information log, and then sends it to the client tool after encryption.

10 Claims, 2 Drawing Sheets

(51) Int. Cl.
   *G06F 21/60*         (2013.01)
   *G06F 21/62*         (2013.01)
(52) U.S. Cl.
   CPC .. *G06F 21/6218* (2013.01); *G06F 2221/0755*
                (2013.01); *G06F 2221/2141* (2013.01)

(56)         References Cited

FOREIGN PATENT DOCUMENTS

| CN | 102271042   |   | 12/2011 |
|----|-------------|---|---------|
| CN | 102271042 A | * | 12/2011 |
| CN | 103944728   |   | 7/2014  |
| CN | 103944728 A | * | 7/2014  |
| CN | 106372531   |   | 2/2017  |

* cited by examiner

METHOD AND SYSTEM FOR AUTHORIZING ACQUISITION OF ATTACK ALARM INFORMATION LOG OF TERMINAL

CROSS-REFERENCE TO RELATED APPLICATION

This application is a 371 of international application of PCT application serial no. PCT/CN2017/096826, filed on Aug. 10, 2017, which claims the priority benefit of China application no. 201610768537.1, filed on Aug. 30, 2016. The entirety of each of the abovementioned patent applications is hereby incorporated by reference herein and made a part of this specification.

FIELD OF THE INVENTION

The present invention relates to the field of communication technology, particularly to a method and system for authorizing acquisition of an attack alarm information log of a terminal.

DESCRIPTION OF RELATED ART

In the field of financial payment, in order to ensure the security of the terminal equipment, the terminal equipment will enter a state of under attack after it suffers attack, continuously display the attack alarm alert and cannot perform the normal payment transaction. To analyze the causes of the attack alarm, it is necessary to obtain a log of the attack alarm information from the terminal. However, the attack alarm information belongs to the sensitive data, if the attack alarm information is being randomly obtained and analyzed, it will cause a major threat to the security of the terminal equipment.

BRIEF SUMMARY OF THE INVENTION

For this purpose, it is necessary to provide a method for authorizing acquisition of an attack alarm information log of a terminal, which is used to solve the problem of being unable to know the causes of the attack alarm after the terminal equipment is being attacked, and the problem that the attack alarm information of the terminal equipment is being randomly and maliciously stolen and analyzed.

In order to achieve the above objective, the inventor provides a method for authorizing acquisition of an attack alarm information log of a terminal, and the technical solution is as follows:

The method for authorizing acquisition of the attack alarm information log of the terminal, includes the following steps:

Obtaining an authentication account by a server, and determining whether the authentication account has an authority to obtain the attack alarm information log by the server; if yes, sending a first to-be-authenticated data to a client tool by the server. The client tool is configured to obtain an operator certificate from a U-KEY. The U-KEY includes an operator private key. Using the operator private key to encrypt the first to-be-authenticated data to generate a first authentication data by the client tool; and sending the operator certificate and the first authorization data to the server by the client tool. Performing an authentication on the first authentication data by the server. If the authentication is passed, sending a second to-be-authenticated data to the client tool by the terminal; and sending the second to-be-authenticated data to the server by the client tool. Receiving the second to-be-authenticated data and performing an authentication on the second to-be-authenticated data by the server. If the authentication is passed, using a first private key to encrypt the second to-be-authenticated data to generate a second authentication data and sending the second authentication data to the terminal by the server. Performing an authentication on the second authentication data, using a first public key, by the terminal. If the authentication is passed, sending an instruction to the terminal by the client tool. Receiving the instruction by the terminal; using a second public key to encrypt the attack alarm information log by the terminal; and sending the attack alarm information log to the client tool by the terminal. Receiving the attack alarm information log by the client tool; and using a second private key to decrypt the attack alarm information log by the client tool to obtain a plaintext of the attack alarm information log.

Further, before obtaining the authentication account by the sever, the method further includes the following steps.

Generating a first public-private key pair and a second public-private key pair by the server. The first public-private key pair includes the first public key and the first private key, and the second public-private key pair includes the second public key and the second private key. Storing the first private key by the server; and sending the first public key and the second public key to the terminal and the second private key to the U-KEY, by the server. Receiving the first public key and the second public key by the terminal.

Further, performing the authentication on the second authentication data by the terminal, includes the following steps:

Using the first public key to decrypt the second authentication data to obtain a plaintext of data to be authenticated in the second authentication data by the terminal; comparing whether the plaintext of the data to be authenticated in the second authentication data and the second to-be-authenticated data is consistent, by the terminal; if yes, the authentication passed.

Further, encrypting the attack alarm information log by the terminal and decrypting the attack alarm information log by the client tool, include the following steps: obtaining the second private key from the U-KEY by the terminal; using the second public key to encrypt the attack alarm information log by the terminal, and sending the attack alarm information logo the client tool by the terminal; receiving the attack alarm information log by the client tool, using the second private key to decrypt the attack alarm information log, by the client tool, to obtain the plaintext of the attack alarm information log.

Further, performing the authentication on the first authentication data by the server, includes the following steps:

Receiving the operator certificate by the server, extracting a public key in the operator certificate by the server, using the public key to decrypt the first authentication data to obtain a plaintext of data to be authenticated in the first authentication data by the server; and comparing whether the plaintext of the data to be authenticated in the first authentication data and the first to-be-authenticated data is consistent, by the server; if yes, the authentication passed.

In order to achieve the above objective, the inventor further provides a system for authorizing acquisition of an attack alarm information log of a terminal, and the technical solution is as follows.

The system for authorizing acquisition of the attack alarm information log of the terminal, includes a server, a terminal, and a client tool. The server is configured to obtain an authentication account and determine whether the authentication account has an authority of obtaining the attack alarm information log; if yes, the server sends a first to-be-authenticated data to the client tool. The client tool is configured to obtain an operator certificate from a U-KEY. The U-KEY includes an operator private key. The client tool is further configured to encrypt a first to-be-authenticated data by using the operator private key to generate a first authentication data. The client tool is further configured to send the operator certificate and the first authentication data to the server. The server is further configured to perform an authentication on the first authentication data; if the authentication is passed, the terminal is configured to send a second to-be-authenticated data to the client tool. The client tool is further configured to send the second to-be-authenticated data to the server. The server is further configured to receive the second to-be-authenticated data and perform an authentication on the second to-be-authenticated data; if the authentication is passed, the server uses a first private key to encrypt the second to-be-authenticated data to generate a second authentication data, and then send the second authentication data to the terminal. The terminal is further used for using a first public key to perform an authentication on the second authentication data; if the authentication is passed, the client tool is further configured to send an instruction to the terminal. The terminal is further used for receiving the instruction, using a second public key to encrypt the attack alarm information log and sending the attack alarm information log to the client tool. The client tool is further used for receiving the attack alarm information log, using a second private key to decrypt the attack alarm information log and obtaining a plaintext of the attack alarm information log.

Further, the server is also used for generating a first public-private key pair and a second public-private key pair before obtaining the authentication account. The first public-private key pair includes the first public key and the first private key, and the second public-private key pair includes the second public key and the second private key. The server stores the first private key, sends the first public key and the second public key to the terminal, and sends the second private key to the U-KEY. The terminal is further used for receiving the first public key and the second public key.

Further, the terminal is also used for using the first public key to decrypt the second authentication data to obtain a plaintext of data to be authenticated in the second authentication data, and compare whether the plaintext of the data to be authenticated in the second authentication data and the second to-be-authenticated data is consistent; if yes, the authentication is passed.

Further, the client tool is also used for obtaining the private key from the U-KEY. The terminal is also used for using the second public key to encrypt the attack alarm information log and sending the attack alarm information log to the client tool. The said client tool is also used for receiving the attack alarm information log and using the second private key to decrypt the attack alarm information log to obtain the plaintext of the attack alarm information log.

Further, the client tool is also used for receiving the operator certificate, extracting a public key in the operator certificate, using the public key to decrypt the first authentication data to obtain a plaintext of the data to be authenticated in the first authentication data, and comparing whether the plaintext of the data to be authenticated in the first authentication data and the first to-be-authenticated data is consistent; if yes, the authentication is passed.

The present invention has the following beneficial effects. The maintenance personnel make the login authentication by using an account, the server determines whether this account has the authority of obtaining the attack alarm information log of the terminal. If this account has the authority of obtaining the attack alarm information log of the terminal, the operator is allowed to use the U-KEY. The server authenticates the legality of the U-KEY. If the U-KEY is valid after authentication, the server generates the second authentication data according to the second to-be-authenticated data, which is obtained from the terminal. After the second authentication data is authenticated by the terminal, the operation of obtaining the attack alarm information log from the terminal is allowed. It adopts two-factor authentication during the whole process, thus greatly ensuring the security. In addition, the instruction of obtaining the attack alarm information log from the terminal is a lawful act approved by the server, ensuring the legality of the operation to obtain the attack alarm information log. Moreover, the obtained attack alarm information log is encrypted and needs to use a specific private key to decrypt, further enhancing the security and confidentiality of the attack alarm information log.

DETAILED DESCRIPTION OF THE INVENTION

To explain the technical contents, structural features, achieved objectives and effects of the technical solutions in detail, the following detailed description will be illustrated with reference to the embodiments and the drawings.

Figure 1:
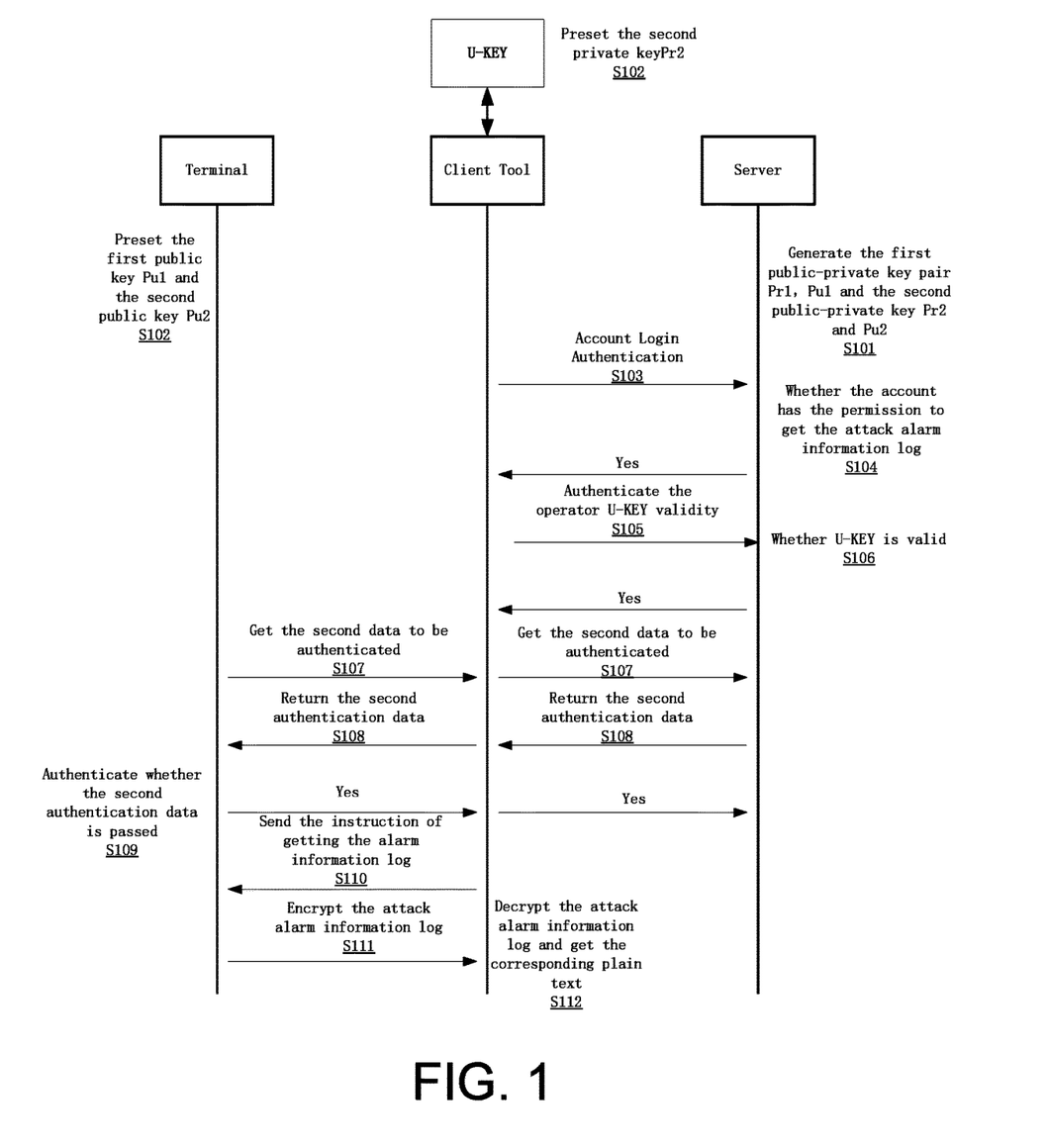
FIG. 1 is a flow diagram of a method for authorizing acquisition of an attack alarm information log of a terminal according to the present invention.

Referring to FIG. 1, in this embodiment, U-KEY is inserted on the client tool. In this embodiment, the client tool is PC, wherein the U-KEY stores the operator certificate and operator private key. When the U-KEY is inserted on the client tool, and interactive software is installed on the client tool, so that the client tool can obtain the operator certificate from the U-KEY and directly use the operator private key. Secondly, in this embodiment, a specific APP is installed on the PC. In the APP login interface, the maintenance personnel need to input the account and password to log into the system; by logging into the system through account and password, the server will determine the authority of the account and password, thereby ensuring the legality of the account.

In other embodiments, it also may directly input the specific website through the browser, and similarly, the maintenance personnel are required to input the account and password to log into the system.

The specific implementation steps are as follows: Step S101, generating a first public-private key pair Pr1 and Pu1 and a second public-private key pair Pr2 and Pu2. Firstly, we ensure that the terminal, server and the client tool are connected to the Internet. After connected to the Internet, the server generates the first public-private key pair Pr1 and Pu1 and the second public-private key pair Pr2 and Pu2, and sends the first public key Pu1 and the second public key Pu2 to the terminal. Namely, step S102: presetting the first public key Pu1 and the second public key Pu2 on the terminal. Meanwhile, the U-KEY is issued, the second private key Pr2 is stored into the U-KEY from the server, and the client tool may obtain the second private key Pr2 from the U-KEY through the installed interactive software. Namely, step S102: presetting the second private key Pr2 to the U-KEY.

Presetting the first public key Pu1 on the terminal is to pass the account authority and the legality authentication of U-KEY in step S103 to step S106, and subsequently, the process processes to step S107. Namely, the server obtains the second to-be-authenticated data from the terminal, and the server determines the legality of the second to-be-authenticated data. After confirming the legality, the server uses the first private key Pr1 to encrypt the second to-be-authenticated data to generate the second authentication data. Step S108: the server returns the second authentication data to the terminal. Step S109: the terminal authenticates whether the second authentication data is passed, namely the terminal may use the preset first public key Pu1 to decrypt the second authentication data, obtain the plaintext of the second authentication data, and compare whether the plaintext of the second authentication data is consistent with the second to-be-authenticated data; and if they are consistent, the authentication is passed. After passing the authentication, the process processes to step S110. Namely, sending an instruction of obtaining the alarm information log, namely the client tool sends the instruction of obtaining the alarm information log to the terminal, and the terminal receives the instruction to obtain the alarm information log. In addition, in step S111, encrypting the attack alarm information log, namely the terminal uses the preset second public key Pu2 to encrypt the attack alarm information log to ensure the security of the attack alarm information log during the data transmission process. After the encryption is complete, the terminal sends the attack alarm information log to the client tool. Step S112: the client tool decrypts the attack alarm information log by using the preset second private key Pr2 to get the plaintext.

During the whole process, firstly determining whether the account of the maintenance personnel has the authority of obtaining the attack alarm information log. If yes, then determining the legality of U-KEY of the operator. The two-factor authentication of account and U-KEY greatly ensures the security of the instruction of obtaining the attack alarm information log. In addition, the instruction of obtaining the attack alarm information log from the terminal is a lawful act approved by the server, ensuring the legality of the operation to obtain the attack alarm information log. Moreover, the obtained attack alarm information log is encrypted by the second public key and needs to use a specific second private key to decrypt, thus further enhancing the security and confidentiality of the attack alarm information log, and solving the problem that some lawbreakers can easily get the attack alarm information log.

The step S103 is as follows: performing account login authentication. In this embodiment, a specific APP is installed on the client tool; in the APP login interface, the maintenance personnel can input the account and password to log into the system.

Among them, the server stores all legal accounts and passwords, including the corresponding authority of these accounts. Step S104: determining whether the account has the authority of obtaining the attack alarm information log, and the specific steps are as follows: the maintenance personnel input the account and password, and the server obtains the account and password input by the maintenance personnel, and determines whether this account and password are stored in the server. If yes, the maintenance personnel successfully log into the system; and meanwhile the server further obtains the authority of this account, and determines whether this account has the authority to obtain the attack alarm information log. Through the authority authentication on the account and password by the server, the legality of the subsequent operations is ensured.

After authenticating that the account has the authority of obtaining the attack alarm information log by the server, the process processes to step S105: authenticating the legality of the U-KEY of operator. The specific steps are as follows:

The client tool obtains the first to-be-authenticated data; firstly, the server generates the first to-be-authenticated data. In this embodiment, the first to-be-authenticated data is a 16-byte random number. The client tool obtains the first to-be-authenticated data from the server.

In other embodiments, the first to-be-authenticated data also may be a random number in other bytes, which may be a combination of 32-byte letters, numbers, special signs, etc. In this embodiment, by generating a 16-byte random number every time, ensuring that the random number generated every time is different.

The client tool uses the U-KEY to generate the first authentication data; after receiving the first to-be-authenticated data, the client tool uses the operator private key stored in U-KEY to encrypt the first to-be-authenticated data, and the first authentication data is generated after encryption. By using the operator private key stored in the U-KEY to encrypt the first to-be-authenticated data, it is ensured that the generated first authentication data will not be intercepted by other illegitimate U-KEYs during the data transmission process to impersonate the truly legitimate U-KEY and trigger security problems.

After generating the first authentication data, the client tool sends the first authentication data and operator certificate to the server for authentication, namely step S106: determining whether U-KEY is legality; the authentication herein refers that the server obtains the plaintext by decrypting the received first authentication data and compares whether the plaintext is consistent with the first to-be-authenticated data on the server. If yes, the U-KEY has passed the authentication of the server and obtained the approval of the server. Namely, the U-KEY has obtained the authority of obtaining the information from the server and sending the information to the server. Among them, the operator certificate sent here contains the public key that can decrypt the first authentication data, so that the server can extract the public key inside the operator certificate after receiving the operator certificate, and then decrypt the first authentication data. For example, if the first to-be-authenticated data is D1, using the operator private key S to encrypt D1 to generate the first authentication data: D2; the public key corresponding to the operator private key S is G. The attack cleanup tool sends D2 and the certificate containing G to the server, and the server extracts G from the certificate and uses G to decrypt D2 and obtain the plaintext information of D2. Comparing whether the plaintext of D1 and D2 is consistent. If yes, the U-KEY passes the authentication of the server; if not, the U-KEY does not pass the authentication of the server.

After the server confirms that the U-KEY is legal, the process processes to step S107: obtaining the second to-be-authenticated data. The specific steps are as follows:

The client tool obtains the second to-be-authenticated data from the terminal; similarly, the terminal generates the second to-be-authenticated data. In this embodiment, the second to-be-authenticated data is a combination of the terminal serial number, mainboard feature code and random number. The terminal serial number and mainboard feature code here are unique and can uniquely identify a terminal. In this embodiment, the random number is a 16-byte random number. In other embodiments, the random number may be letters or characters in other digits. The uniqueness of the second to-be-authenticated data is ensured by using the combination of the terminal serial number, mainboard feature code and random number with uniquely identified terminal.

After the terminal generates the second to-be-authenticated data, the client tool obtains the second to-be-authenticated data.

After obtaining the second to-be-authenticated data, the client tool sends the second to-be-authenticated data to the server; and the server determines whether the information of the terminal equipment is legitimate by authenticating the second to-be-authenticated data. If yes, the server uses the first private key Pr1 to encrypt the second to-be-authenticated data to generate the second authentication data.

In this embodiment, considering the high safety requirement, as the public key used by every terminal is different, when the server determines the terminal information, it not merely determines its legality, but also uses the private key corresponding to the terminal to encrypt the to-be-authenticated data according to the terminal information. Through encrypting the to-be-authenticated data by using the private key, it is ensured that the generated authentication data will not be intercepted by other lawbreakers during data transmission process to impersonate the truly legitimate server to cheat the terminal and cause any security problem.

While in some other embodiments, considering the convenience and universality, the public key used by every terminal is the same. Thus, the server only needs to determine the legality of the terminal information; and the server uses a general private key to encrypt the to-be-authenticated data.

Step S108: returning the second authentication data. The specific steps are as follows: The server sends the second authentication data to the terminal through the client tool, and the terminal authenticates the second authentication data. Namely, step S109: determining whether the second authentication data has passed the authentication. The specific steps are as follows: The terminal uses the first public key Pu1 preset in step S102 to decrypt the second authentication data to obtain the plaintext of the second authentication data, and compares whether the plaintext of the second authentication data is consistent with the plaintext of the second to-be-authenticated data. If yes, the authentication passed.

If the authentication is passed, it means the server also passes the authentication of the terminal. Then the U-KEY holder approved by the server has the authority to use the client tool to send the instruction of obtaining the attack alarm information log to the terminal (namely step S110). Among them, the instruction at least includes: operating as per instruction of obtaining the attack alarm information log from the terminal, thus avoiding illegal operations. In addition, in order to ensure the security of the attack alarm information log during the data transmission process, in step S111, the attack alarm information log is encrypted. The terminal here uses the preset second public key Pu2 to encrypt the attack alarm information log. After that, the terminal sends the attack alarm information log to the client tool.

Step S112: decrypting the attack alarm information log to obtain the corresponding plaintext. The client tool receives the attack alarm information log and uses the preset second private key Pr2 to decrypt the attack alarm information log to obtain the plaintext. After the U-KEY passes authentication of the server, the subsequent steps all can be completed automatically, which greatly improves the speed of obtaining the attack alarm information log.

Figure 2:
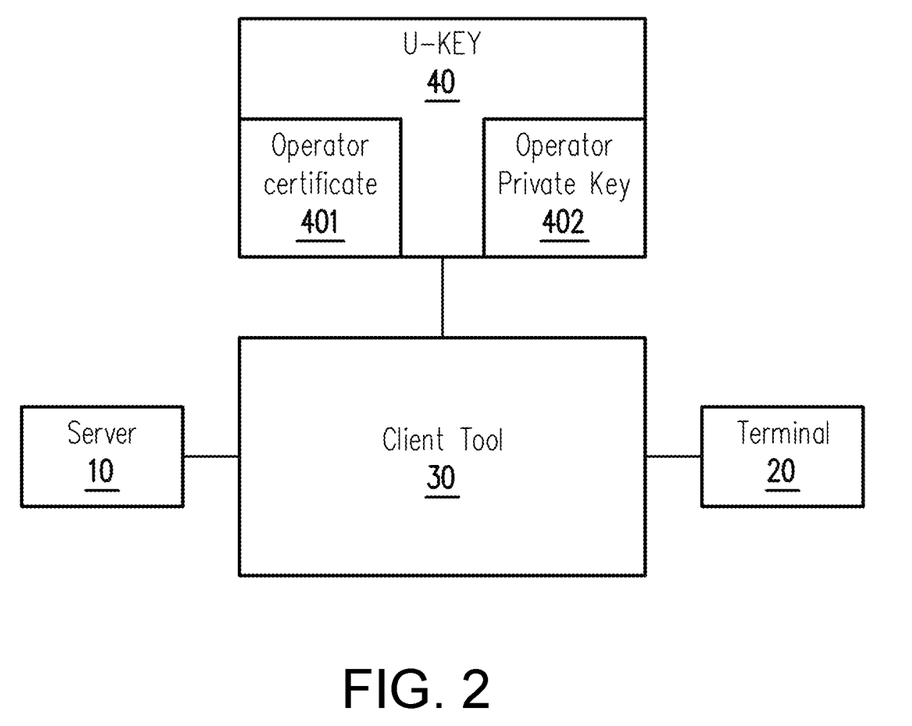
FIG. 2 is a module diagram of a system for authorizing acquisition of an attack alarm information log of a terminal according to the present invention.

Referring to FIG. 2, in some embodiments, according to the present invention, the scheme of a system for authorizing acquisition of an attack alarm information log of a terminal is as follows:

The system includes: a server 10, a terminal 20 and a client tool 30. Among them, the U-KEY40 is inserted into the client tool 30. In this embodiment, the client tool 30 is PC. an operator certificate 401 and an operator private key 402 are stored in the U-KEY40. After U-KEY40 is inserted into the client tool 30, as an interactive software is installed on the client tool 30, the client tool 30 can obtain the operator certificate 401 and the operator private key 402 through the interactive software.

The details are as follows:

The server 10 is used for generating a first public-private key pair Pr1 and Pu1 and a second public-private key pair Pr2 and Pu2, and sending the first public key Pu1 and the second public key Pu2 to the terminal 20. Meanwhile, when the U-KEY40 is issued, the second private key Pr2 is stored into the U-KEY40 from the server.

The client tool 30 is used for obtaining the second private key Pr2 through the installed interactive software from the U-KEY40.

In this embodiment, a specific APP is installed on the client tool 30. In the APP login interface, the maintenance personnel input the account and password to log in to the system.

The server 10 stores all valid accounts and passwords, including the corresponding authorities of these accounts. The maintenance personnel input the account and password, and the server 10 obtains the account and password input by the maintenance personnel, and determines whether such account and password are stored in the server 10. If they are stored in the server 10, the maintenance personnel successfully log in to the system; and meanwhile, the server 10 further obtains the authority of such account, and determines whether such account has the authority to obtain the attack alarm information log. Through the authority authentication on the account and password by Server 10, the legality of subsequent operations is ensured.

After authenticating that the account has the authority to obtain the attack alarm information log, the server 10 authenticates the legality of the operator U-KEY40. The details are as follows:

The client tool 30 obtains the first to-be-authenticated data from the server 10; firstly, the server 10 generates the first to-be-authenticated data. In this embodiment, the first to-be-authenticated data is a 16-byte random number. The client tool 30 obtains the first to-be-authenticated data the server.

The client tool 30 uses the U-KEY to generate the first authentication data; after receiving the first to-be-authenticated data, the client tool 30 uses the operator private key 402 stored in U-KEY to encrypt the first to-be-authenticated data, and the first authentication data is generated after encryption. Through the operator private key 402 stored in the U-KEY, the first to-be-authenticated data is encrypted, which ensures that the generated first authentication data will not be intercepted by other unauthorized U-KEY40 during the data transmission process to impersonate the truly legitimate U-KEY40 and trigger security problems.

After the first authentication data is generated, the client tool 30 sends the first authentication data and operator certificate 401 to the server 10 for authentication. Such authentication refers to "that the server 10 obtains the plaintext by decrypting the received first authentication data, and compares whether such plaintext is the consistent with the first to-be-authenticated data of the server 10". If they are consistent, the U-KEY40 passes the authentication of the server 10 and obtains the approval of the server 10. In other words, the U-KEY40 obtains the authority to obtain information from and the server 10 send the information to the server 10.

After the server 10 confirms the legality of the U-KEY40, the client tool 30 obtains the second to-be-authenticated data from the terminal 20; similarly, the terminal 20 generates the second to-be-authenticated data. In this embodiment, the second to-be-authenticated data is a combination of the terminal serial number, mainboard feature code and random number. Such terminal serial number and mainboard feature code are unique and can uniquely identify a terminal 120. Through using the combination of terminal serial number, mainboard feature code and random number with uniquely identified terminal, the uniqueness of the second to-be-authenticated data is ensured.

After the terminal 20 generates the second to-be-authenticated data, Client Tool 30 gets the second to-be-authenticated data.

After obtaining the second to-be-authenticated data, the client tool 30 sends the second to-be-authenticated data and terminal information to the server 10; and the server 10 determines whether the information of the terminal equipment is legitimate by authenticating the second to-be-authenticated data. If such information is legitimate, the server 10 uses the first authentication private key Pr1 to encrypt the second to-be-authenticated data to generate the second authentication data.

Through the client tool 30, the server 10 sends the second authentication data to the terminal 120 for authentication. The details are as follows: the terminal 20 uses the preset first public key Pu1 to decrypt the second authentication data to obtain the plaintext of the second authentication data, and compares whether the plaintext of the second authentication data is consistent with the second to-be-authenticated data. If they are consistent, the authentication passed.

If the authentication is passed, it means that the server 10 also passes the authentication of the terminal 20. Then, the U-KEY40 holder approved by the server 10 has the authority to send the instruction of obtaining the attack alarm information log to the terminal 20 through the client tool 30. The instruction at least includes: operating as per instruction of obtaining the attack alarm information log from the terminal 20, thus avoiding illegal operations. In addition, in order to ensure the security of the attack alarm information log during the transmission process. The terminal 20 is also used for encrypting the attack alarm information log by the preset second public key Pu2, and sending the attack alarm information log to the client tool 30 after encryption.

The client tool 30 is also used for receiving the attack alarm information log, and decrypting the attack alarm information log by the preset second private key Pr2 to obtain the plaintext. After U-KEY40 passes the authentication of the server 10, the subsequent steps all can be completed automatically, which greatly improves the speed of obtaining the attack alarm information log.

In all embodiments of the present invention, if the authentication is invalid or the account has no corresponding authority, the method is ended prematurely, and the data stream in the system will not flow to the next module.

It should be noted that the relational terms herein such as first and second are used only to differentiate an entity or operation from another entity or operation, and do not require or imply any actual relationship or sequence between these entities or operations. In addition, term "comprise", "include", or any other variant thereof aims to cover non-exclusive "include", so that a process, method, object, or terminal device that comprises a series of elements not only comprises the elements, but also comprises other elements that are not definitely listed, or further comprises inherent elements of the process, method, object, or terminal device. In a case in which there are no more limitations, an element defined by the sentence "comprise . . . " or "include . . . " does not exclude the case in which other elements further exist in a process, method, or object, or terminal device that comprises the element. In addition, in this text, "greater than", "less than", "exceed", and the like are understood as not including the number. "More", "fewer", "within", and the like are understood as including the number.

A person skilled in the art should understand that the foregoing embodiments may provide a method, an apparatus, a device, or a computer program product. These embodiments may use forms of full hardware embodiments, full software embodiments, or embodiments of a combination of software and hardware aspects. All or some of the steps in the methods involved in the foregoing embodiments may be implemented by using a program instructing relevant hardware. The program may be stored in a computer device readable storage medium for performing all or some of the steps of the methods in the foregoing embodiments. The computer device includes but is not limited to: a personal computer, a server, a general-purpose computer, a dedicated computer, a network device, an embedded device, a programmable device, an intelligent mobile terminal, an intelligent home device, a wearable intelligent device, an in-vehicle intelligent device, and the like. The storage medium includes but is not limited to: a RAM, a ROM, a magnetic disk, a magnetic tape, an optical disc, a flash memory, a USB flash drive, a removable hard disk, a memory card, a memory stick, network server storage, network cloud storage, and the like.

The foregoing embodiments are described with reference to flowcharts and/or block diagrams of the method, the device (the system), and the computer program product in the embodiments. It should be understood that computer program instructions may be used for implementing each process and/or each block in the flowcharts and/or the block diagrams and a combination of a process and/or a block in the flowcharts and/or the block diagrams. These computer program instructions may be provided to a computer of a computer device to generate a machine, so that instructions executed by the processor of the computer device generate an apparatus configured to implement specific functions in one or more processes in the flowcharts and/or in one or more blocks in the block diagrams.

These computer program instructions may further be stored in a computer device readable memory that can instruct the computer device to work in a specific manner, so that the instructions stored in the computer device readable memory generate an artifact that includes an instruction apparatus. The instruction apparatus implements specific functions in one or more processes in the flowcharts and/or in one or more blocks in the block diagrams.

These computer program instructions may further be loaded onto a computer device, so that a series of operations and steps are performed on the computer device, thereby generating computer-implemented processing. Therefore, the instructions executed on the computer device provide steps for implementing specific functions in one or more processes in the flowcharts and/or in one or more blocks in the block diagrams.

Although the foregoing embodiments are described, once a person skilled in the art learns a basic inventive concept, the person skilled in the art may make additional changes and modifications to these embodiments. Therefore, the foregoing descriptions are merely embodiments of the present invention, and are not intended to limit the patent protection scope of the present invention. Any equivalent structural change or any equivalent process change that is made by using the contents of the description and the accompanying drawings of the present invention is directly or indirectly applied to technical fields related thereto, and likewise falls into the patent protection scope of the present invention.

What is claimed is:

1. A method for authorizing acquisition of an attack alarm information log of a terminal, comprising:
    obtaining an authentication account by a server, and determining whether the authentication account has an authority to obtain the attack alarm information log by the server;
    if it is determined by the server that the authentication account has the authority to obtain the attack alarm information log, sending first to-be-authenticated data to a client tool by the server, and obtaining an operator certificate from a U-KEY by the client tool, wherein the U-KEY comprises an operator private key;
    using the operator private key to encrypt the first to-be-authenticated data to generate first authentication data by the client tool, and sending the operator certificate and the first authorization data to the server;
    performing a first authentication on the first authentication data by the server;
    if the first authentication is passed, sending second to-be-authenticated data to the client tool by the terminal, and then sending the second to-be-authenticated data to the server by the client tool;
    receiving the second to-be-authenticated data by the server, and performing a second authentication on the second to-be-authenticated data by the server;
    if the second authentication is passed, using a first private key to encrypt the second to-be-authenticated data to generate second authentication data by the server, and sending the second authentication data to the terminal by the server;
    using a first public key to perform a third authentication on the second authentication data by the terminal;
    if the third authentication is passed, sending an instruction to the terminal by the client tool, receiving the instruction by the terminal, using a second public key to encrypt the attack alarm information log and sending the said attack alarm information log to the client tool by the terminal; and
    receiving the attack alarm information log by the client tool, and using a second private key to decrypt the attack alarm information log to obtain a plaintext of the attack alarm information log.

2. The method for authorizing acquisition of the attack alarm information log of the terminal according to claim 1, wherein before the step of obtaining the authentication account by the server, the method further comprises:
    generating a first public-private key pair and a second public-private key pair, wherein the first public-private key pair comprises the first public key and the first private key, and the second public-private key pair comprises the second public key and the second private key;
    storing the first private key by the server, and sending the first public key and the second public key to the terminal and the second private key to the U-KEY, by the server; and
    receiving the first public key and the second public key by the terminal.

3. The method for authorizing acquisition of the attack alarm information log of the terminal according to claim 2, wherein the step of performing the third authentication on the second authentication data comprises:
    using the first public key to decrypt the second authentication data to obtain a plaintext of data to be authenticated in the second authentication data by the terminal; and
    comparing whether the plaintext of the data to be authenticated in the second authentication data and the second to-be-authenticated data is consistent by the terminal, wherein if the plaintext of the data to be authenticated in the second authentication data and the second to-be-authenticated data is consistent, the third authentication is passed.

4. The method for authorizing acquisition of the attack alarm information log of the terminal according to claim 2, wherein the step of encrypting the attack alarm information log by the terminal and the step of decrypting the attack alarm information log by the client tool comprise:
    obtaining the second private key from the U-KEY by the terminal;
    using the second public key to encrypt the attack alarm information log by the terminal, and sending the attack alarm information logo the client tool by the terminal; and
    receiving the attack alarm information log by the client tool, and using the second private key to decrypt the attack alarm information log to obtain the plaintext of the attack alarm information log, by the client tool.

5. The method for authorizing acquisition of the attack alarm information log of the terminal according to claim 1, wherein the step of performing the first authentication on the first authentication data by the server comprises:
    receiving the operator certificate by the server;
    extracting a public key in the operator certificate by the server;
    using the public key to decrypt the said first authentication data to obtain a plaintext of data to be authenticated in the first authentication data by the server; and
    comparing whether the plaintext of the data to be authenticated in the authentication data and the first to-be-authenticated data is consistent by the server, wherein if the plaintext of the data to be authenticated in the authentication data and the first to-be-authenticated data is consistent, the first authentication is passed.

6. A system for authorizing acquisition of an attack alarm information log of a terminal, wherein the system comprises a server, a terminal and a client tool, and the terminal, the server and the client tool are connected to an internet, wherein
    the server is configured to obtain an authentication account and determine whether the authentication account has an authority of obtaining the attack alarm information log, wherein if it is determined by the server that the authentication account has the authority of obtaining the attack alarm information log, the server is further configured to send first to-be-authenticated data to the client tool, wherein the client tool is configured to obtain an operator certificate from a U-KEY, wherein the U-KEY comprises an operator private key, and the client tool is further configured to encrypt the first to-be-authenticated data by using the operator private key to generate first authentication data, and send the operator certificate and the first authentication data to the server, wherein the server is further configured to perform a first authentication on the first authentication data, wherein if the first authentication is passed, the terminal is configured to send second to-be-authenticated data to the client tool, wherein the client tool is further configured to send the second to-be-authenticated data to the server, and the server is further configured to receive the second to-be-authenticated data and perform a second authentication on the second to-be-authenticated data, wherein if the second authentication is passed, the server is further configured to use a first private key to encrypt the second to-be-authenticated data to generate a second authentication data, and then send the second authentication data to the terminal, wherein the terminal is further configured to use a first public key to perform a third authentication on the second authentication data, wherein if the third authentication is passed, the client tool is further configured to send an instruction to the terminal, and the terminal is further configured to receive the instruction, use the second public key to encrypt the attack alarm information log and send the attack alarm information log to the client tool, and wherein the client tool is further configured to receive the attack alarm information log, use a second private key to decrypt the attack alarm information log and obtain a plaintext of the attack alarm information log.

7. The system for authorizing acquisition of the attack alarm information log of the terminal according to claim 6, wherein the server is further configured to generate a first public-private key pair and a second public-private key pair before obtaining the authentication account, wherein the first public-private key pair comprises the first public key and the first private key, and the second public-private key pair comprises the second public key and the second private key, wherein the server is further configured to store the first private key, send the first public key and the second public key to the terminal, and send the second private key to the U-KEY, and wherein the terminal is further configured to receive the first public key and the second public key.

8. The system for authorizing acquisition of the attack alarm information log of the terminal according to claim 7, wherein the terminal is further configured to use the first public key to decrypt the second authentication data to obtain a plaintext of data to be authenticated in the second authentication data, and compare whether the plaintext of the data to be authenticated in the second authentication data and the second to-be-authenticated data is consistent, wherein if the plaintext of the data to be authenticated in the second authentication data and the second to-be-authenticated data is consistent, the third authentication is passed.

9. The system for authorizing acquisition of the attack alarm information log of the terminal according to claim 7, wherein the client tool is further configured to obtain the private key from the U-KEY, wherein the terminal is further configured to use the second public key to encrypt the attack alarm information log and send the attack alarm information log to the client tool, and wherein the client tool is further configured to receive the attack alarm information log and use the second private key to decrypt the attack alarm information log to obtain the plaintext of the attack alarm information log.

10. The system for authorizing acquisition of the attack alarm information log of the terminal according to claim 6, wherein the client is further configured to receive the operator certificate, extract a public key in the operator certificate, use the public key to decrypt the first authentication data to obtain a plaintext of data to be authenticated in the first authentication data, and compare whether the plaintext of the data to be authenticated in the first authentication data and the first to-be-authenticated data is consistent, wherein if the plaintext of the data to be authenticated in the first authentication data and the first to-be-authenticated data is consistent, the first authentication is passed.

* * * * *